United States Patent
Clauson et al.

(10) Patent No.: US 10,787,968 B2
(45) Date of Patent: Sep. 29, 2020

(54) GAS TURBINE ENGINE MOTORING WITH STARTER AIR VALVE MANUAL OVERRIDE

(71) Applicant: United Technologies Corporation, Farmington, CT (US)

(72) Inventors: Jesse W. Clauson, Agawam, MA (US); David Gelwan, Glastonbury, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 1035 days.

(21) Appl. No.: 15/281,238

(22) Filed: Sep. 30, 2016

(65) Prior Publication Data

US 2018/0094588 A1    Apr. 5, 2018

(51) Int. Cl.
| | |
|---|---|
| *F02C 7/277* | (2006.01) |
| *F02C 7/32* | (2006.01) |
| *F01D 19/02* | (2006.01) |
| *F02C 3/04* | (2006.01) |

(52) U.S. Cl.
CPC ............. *F02C 7/277* (2013.01); *F01D 19/02* (2013.01); *F02C 3/04* (2013.01); *F02C 7/32* (2013.01); *F05D 2220/50* (2013.01); *F05D 2260/85* (2013.01); *F05D 2270/304* (2013.01)

(58) Field of Classification Search
CPC .... F02C 7/26; F02C 7/27; F02C 7/275; F02C 7/277; F02C 7/32; F02C 3/04; F02C 9/18; F02C 9/20; F02C 9/28; F02C 6/08; F01D 19/02; F05D 2220/50; F05D 2260/85; F05D 2270/304
USPC .......................................................... 60/786
See application file for complete search history.

(56) References Cited

U.S. PATENT DOCUMENTS

| | | | |
|---|---|---|---|
| 1,951,875 | A | 3/1934 | Laabs |
| 2,617,253 | A | 11/1952 | Fusner et al. |
| 2,840,987 | A | 7/1958 | Bloomberg et al. |
| 2,962,597 | A | 11/1960 | Evans |
| 3,057,155 | A | 10/1962 | Rizk |
| 3,098,626 | A | 7/1963 | Messinger |

(Continued)

FOREIGN PATENT DOCUMENTS

| | | |
|---|---|---|
| EP | 1258618 A2 | 11/2002 |
| EP | 2305986 | 4/2011 |

(Continued)

OTHER PUBLICATIONS

EP Application No. 17199896.6 Office Action dated Dec. 11, 2018, 3 pages.

(Continued)

*Primary Examiner* — Mark A Laurenzi
*Assistant Examiner* — Loren C Edwards
(74) *Attorney, Agent, or Firm* — Cantor Colburn LLP

(57) ABSTRACT

A system for gas turbine engine motoring includes an air turbine starter coupled to a gearbox of a gas turbine engine and a starter air valve in fluid communication with the air turbine starter to drive motoring of the gas turbine engine responsive to a regulated pressure from a compressed air source. A manual override of the starter air valve is adjustable to one or more predefined intermediate positions that partially open the starter air valve to limit a motoring speed of the gas turbine engine below a resonance speed of a starting spool of the gas turbine engine responsive to the regulated pressure.

17 Claims, 4 Drawing Sheets

(56) References Cited

U.S. PATENT DOCUMENTS

| | | | |
|---|---|---|---|
| 3,151,452 A | 10/1964 | Bunger et al. | |
| 3,764,815 A | 10/1973 | Habock et al. | |
| 3,793,905 A | 2/1974 | Black et al. | |
| 3,812,378 A | 5/1974 | Coman | |
| 3,898,439 A | 8/1975 | Reed et al. | |
| 3,951,008 A | 4/1976 | Schneider et al. | |
| 4,044,550 A | 8/1977 | Vermilye | |
| 4,069,424 A | 1/1978 | Burkett | |
| 4,144,421 A | 3/1979 | Sakai | |
| 4,380,146 A | 4/1983 | Yannone et al. | |
| 4,598,551 A | 7/1986 | Dimitroff, Jr. et al. | |
| 4,627,234 A | 12/1986 | Schuh | |
| 4,669,893 A | 6/1987 | Chalaire et al. | |
| 4,702,273 A * | 10/1987 | Allen, Jr. | F02C 7/277 |
| | | | 123/179.31 |
| 4,713,985 A | 12/1987 | Ando | |
| 4,733,529 A | 3/1988 | Nelson et al. | |
| 4,854,120 A | 8/1989 | Nelson et al. | |
| 4,979,362 A | 12/1990 | Vershure, Jr. | |
| 4,979,365 A | 12/1990 | Baker | |
| 5,103,629 A | 4/1992 | Mumford et al. | |
| 5,123,239 A | 6/1992 | Rodgers | |
| 5,127,220 A | 7/1992 | Jesrai et al. | |
| 5,174,109 A | 12/1992 | Lampe | |
| 5,184,458 A | 2/1993 | Lampe et al. | |
| 5,201,798 A | 4/1993 | Hogan | |
| 5,349,814 A | 9/1994 | Ciokajlo et al. | |
| 6,146,090 A | 11/2000 | Schmidt | |
| 6,168,377 B1 | 1/2001 | Wolfe et al. | |
| 6,190,127 B1 | 2/2001 | Schmidt | |
| 6,318,958 B1 | 11/2001 | Giesler et al. | |
| 6,478,534 B2 | 11/2002 | Bangert et al. | |
| 6,498,978 B2 | 12/2002 | Leamy et al. | |
| 6,517,314 B1 | 2/2003 | Burnett et al. | |
| 6,558,118 B1 | 5/2003 | Brisson et al. | |
| 6,681,579 B2 | 1/2004 | Lane et al. | |
| 6,762,512 B2 | 7/2004 | Nelson | |
| 6,884,027 B2 | 4/2005 | Faulkner | |
| 6,935,836 B2 | 8/2005 | Ress, Jr. et al. | |
| 7,104,072 B2 | 9/2006 | Thompson | |
| 7,133,801 B2 | 11/2006 | Song | |
| 7,409,319 B2 | 8/2008 | Kant et al. | |
| 7,428,819 B2 | 9/2008 | Cataldi et al. | |
| 7,507,070 B2 | 3/2009 | Jones | |
| 7,513,119 B2 | 4/2009 | Zielinski et al. | |
| 7,543,439 B2 | 6/2009 | Butt et al. | |
| 7,587,133 B2 | 9/2009 | Franke et al. | |
| 7,742,881 B2 | 6/2010 | Muralidharan et al. | |
| 7,770,400 B2 | 8/2010 | Iasillo et al. | |
| 7,909,566 B1 | 3/2011 | Brostmeyer | |
| 7,972,105 B2 | 7/2011 | Dejoris et al. | |
| 8,090,456 B2 | 1/2012 | Karpman et al. | |
| 8,291,715 B2 | 10/2012 | Libera et al. | |
| 8,306,776 B2 | 11/2012 | Ihara et al. | |
| 8,744,634 B2 | 6/2014 | Purani et al. | |
| 8,770,913 B1 | 7/2014 | Negron et al. | |
| 8,776,530 B2 | 7/2014 | Shirooni et al. | |
| 8,820,046 B2 | 9/2014 | Ross et al. | |
| 8,918,264 B2 | 12/2014 | Jegu et al. | |
| 9,046,111 B2 | 6/2015 | Harvey et al. | |
| 9,086,018 B2 | 7/2015 | Winston et al. | |
| 9,103,284 B2 | 8/2015 | Erickson et al. | |
| 9,121,309 B2 | 9/2015 | Geiger | |
| 9,732,762 B2 | 8/2017 | Duong et al. | |
| 10,125,690 B2 | 11/2018 | Zaccaria et al. | |
| 2002/0173897 A1 | 11/2002 | Leamy et al. | |
| 2003/0145603 A1 | 8/2003 | Reed et al. | |
| 2004/0000656 A1* | 1/2004 | Wiggins | F02C 7/277 |
| | | | 251/289 |
| 2004/0131138 A1 | 7/2004 | Correia et al. | |
| 2007/0234738 A1 | 10/2007 | Borcea | |
| 2009/0301053 A1 | 12/2009 | Geiger | |
| 2010/0085676 A1 | 4/2010 | Wilfert | |
| 2010/0095791 A1 | 4/2010 | Galloway | |
| 2010/0132365 A1 | 6/2010 | Labala | |
| 2010/0293961 A1 | 11/2010 | Tong et al. | |
| 2010/0326085 A1 | 12/2010 | Veilleux | |
| 2011/0077783 A1 | 3/2011 | Karpman et al. | |
| 2011/0146276 A1 | 6/2011 | Sathyanarayana et al. | |
| 2011/0153295 A1 | 6/2011 | Yerramalla et al. | |
| 2011/0296843 A1 | 12/2011 | Lawson, Jr. | |
| 2012/0240591 A1 | 9/2012 | Snider et al. | |
| 2012/0266601 A1 | 10/2012 | Miller | |
| 2012/0266606 A1 | 10/2012 | Zeiner et al. | |
| 2013/0031912 A1 | 2/2013 | Finney et al. | |
| 2013/0091850 A1 | 4/2013 | Francisco | |
| 2013/0101391 A1 | 4/2013 | Szwedowicz et al. | |
| 2013/0251501 A1 | 9/2013 | Araki et al. | |
| 2014/0123673 A1 | 5/2014 | Mouze et al. | |
| 2014/0154087 A1 | 6/2014 | Kirchner et al. | |
| 2014/0199157 A1 | 7/2014 | Haerms et al. | |
| 2014/0233089 A1 | 8/2014 | Fermann et al. | |
| 2014/0241878 A1 | 8/2014 | Herrig et al. | |
| 2014/0271152 A1 | 9/2014 | Rodriguez | |
| 2014/0283527 A1 | 9/2014 | Ling et al. | |
| 2014/0301820 A1 | 10/2014 | Lohse et al. | |
| 2014/0318144 A1 | 10/2014 | Lazzeri et al. | |
| 2014/0334927 A1 | 11/2014 | Hammerum | |
| 2014/0366546 A1 | 12/2014 | Bruno et al. | |
| 2014/0373518 A1 | 12/2014 | Manneville et al. | |
| 2014/0373532 A1 | 12/2014 | Diemer et al. | |
| 2014/0373552 A1 | 12/2014 | Zaccaria et al. | |
| 2014/0373553 A1* | 12/2014 | Zaccaria | F02C 7/277 |
| | | | 60/778 |
| 2014/0373554 A1 | 12/2014 | Pech et al. | |
| 2015/0016949 A1 | 1/2015 | Smith | |
| 2015/0096359 A1 | 4/2015 | Catt | |
| 2015/0115608 A1 | 4/2015 | Draper | |
| 2015/0121874 A1 | 5/2015 | Yoshida et al. | |
| 2015/0128592 A1 | 5/2015 | Filiputti et al. | |
| 2015/0159625 A1 | 6/2015 | Hawdwicke, Jr. et al. | |
| 2015/0167553 A1 | 6/2015 | Nesdill et al. | |
| 2016/0332736 A1 | 11/2016 | Parmentier et al. | |
| 2016/0348588 A1 | 12/2016 | Ross et al. | |
| 2017/0233089 A1 | 8/2017 | Zaccaria et al. | |
| 2017/0234235 A1 | 8/2017 | Pech | |
| 2017/0234238 A1 | 8/2017 | Schwarz et al. | |
| 2017/0342908 A1* | 11/2017 | Hon | F02C 7/26 |
| 2018/0022463 A1 | 1/2018 | Teicholz et al. | |
| 2018/0022464 A1 | 1/2018 | Gelwan et al. | |
| 2018/0022465 A1 | 1/2018 | Gelwan et al. | |
| 2018/0023413 A1 | 1/2018 | Chowdhury et al. | |
| 2018/0023479 A1 | 1/2018 | Clauson et al. | |
| 2018/0023484 A1 | 1/2018 | Gelwan et al. | |
| 2018/0045122 A1 | 2/2018 | Veilleux | |
| 2018/0149090 A1 | 5/2018 | Maalouf et al. | |
| 2018/0230946 A1 | 8/2018 | Virtue, Jr. et al. | |

FOREIGN PATENT DOCUMENTS

| | | | |
|---|---|---|---|
| EP | 2514949 A2 | 10/2012 | |
| EP | 3205836 A1 | 8/2017 | |
| EP | 3205843 A1 | 8/2017 | |
| EP | 3205849 A1 | 8/2017 | |
| EP | 3205859 A1 | 8/2017 | |
| EP | 3208429 A1 | 8/2017 | |
| EP | 3273007 A1 | 1/2018 | |
| EP | 3273008 A1 | 1/2018 | |
| FR | 2933131 | 1/2010 | |
| GB | 717183 A * | 10/1954 | F01D 21/02 |
| GB | 1186375 | 4/1970 | |
| GB | 1374810 | 11/1974 | |
| GB | 2117842 | 10/1983 | |
| IN | 201408865 | 5/2015 | |
| JP | 2002371806 | 12/2002 | |
| JP | 2004036414 | 2/2004 | |
| WO | 9900585 | 1/1999 | |
| WO | 2013007912 | 1/2013 | |
| WO | 2014152701 | 9/2014 | |
| WO | 2015030946 | 3/2015 | |

(56) References Cited

FOREIGN PATENT DOCUMENTS

WO          2015145034 A1    10/2015
WO          2016203157 A1    12/2016

OTHER PUBLICATIONS

European Search Report for Application No. EP17194050, dated Feb. 8, 2018 (6 pp.).
Extended European Search Report for Application No. 17181728.1-1607 dated Dec. 21, 2017 (8 pp.).
Extended European Search Report for Application No. 17181931.1-1607 dated Dec. 8, 2017 (7 pp.).
Extended European Search Report for Application No. 17181979.0-1607 dated Dec. 13, 2017 (8 pp.).
Extended European Search Report for Application No. 17182145.7-1607 dated Dec. 7, 2017 (7 pp.).
Extended European Search Report for Application No. 17182405.5-1607 dated Dec. 18, 2017 (7 pp.).
Extended European Search Report for Application No. 17182126.7-1007, dated Feb. 16, 2018 (7 pp.).
Extended European Search Report for Application No. 17199896.6-1006, dated Mar. 7, 2018 (11 pp.).
Calculation Method and Simulation of Air Bleeding Loss for Aircraft Start System; San Mai Su, et al., 2018 37th Chinese Control Conference (CCC); pp. 1764-1769; IEEE Conference; year 2018.
Second law analysis of extra power requirements for a cascade of industrial compressors; S. Strevell et al, IECEC-97 Proceedings of the Thirty-Second Intersociety Energy Conversion Eng. Conf. (Cat No. 97CH6203); vol. 3, pp. 1581-1586; IEE Conf; year 1997.
EP Application No. 17200204.0 Extended EP Search Report dated May 15, 2018, 6 pages.

* cited by examiner

GAS TURBINE ENGINE MOTORING WITH STARTER AIR VALVE MANUAL OVERRIDE

BACKGROUND

This disclosure relates to gas turbine engines, and more particularly to systems and methods for gas turbine engine motoring using a starter air valve with a manual override.

Gas turbine engines are used in numerous applications, one of which is for providing thrust to an airplane. When the gas turbine engine of an airplane has been shut off for example, after an airplane has landed at an airport, the engine is hot and due to heat rise, the upper portions of the engine will be hotter than lower portions of the engine. When this occurs thermal expansion may cause deflection of components of the engine which may result in a "bowed rotor" condition. If a gas turbine engine is in such a bowed rotor condition it is undesirable to restart or start the engine.

One approach to mitigating a bowed rotor condition is to use a starter system to drive rotation (i.e., dry motoring) of a spool within the engine for an extended period of time at a speed below which a resonance occurs (i.e., a critical speed or frequency) that may lead to damage when a sufficiently large bowed rotor condition is present. If a starter air valve of the starter system fails closed, the starter system may be incapable of performing dry motoring. If the starter air valve fails open, the starter system may be incapable of controlling the motoring speed, potentially reaching the resonance speed.

BRIEF DESCRIPTION

In an embodiment, a system for gas turbine engine motoring includes an air turbine starter coupled to a gearbox of a gas turbine engine and a starter air valve in fluid communication with the air turbine starter to drive motoring of the gas turbine engine responsive to a regulated pressure from a compressed air source. A manual override of the starter air valve is adjustable to one or more predefined intermediate positions that partially open the starter air valve to limit a motoring speed of the gas turbine engine below a resonance speed of a starting spool of the gas turbine engine responsive to the regulated pressure.

In addition to one or more of the features described above, or as an alternative to any of the foregoing embodiments, further embodiments may include where the compressed air source is an auxiliary power unit, a ground cart, or a cross engine bleed.

In addition to one or more of the features described above, or as an alternative to any of the foregoing embodiments, further embodiments may include where at least one valve of the compressed air source sets the regulated pressure.

In addition to one or more of the features described above, or as an alternative to any of the foregoing embodiments, further embodiments may include a controller that adjusts the at least one valve of the compressed air source in response to at least one parameter of the gas turbine engine to maintain the motoring speed of the gas turbine engine below the resonance speed.

In addition to one or more of the features described above, or as an alternative to any of the foregoing embodiments, further embodiments may include where the at least one parameter includes one or more of: an engine speed of the gas turbine engine, a starter speed of the air turbine starter, and a starter air pressure.

In addition to one or more of the features described above, or as an alternative to any of the foregoing embodiments, further embodiments may include where the controller dynamically adjusts the at least one valve based on one or more of: a pressure change of the compressed air source and a change in a targeted motoring speed of the gas turbine engine.

In addition to one or more of the features described above, or as an alternative to any of the foregoing embodiments, further embodiments may include where the one or more predefined intermediate positions are set by one or more detents.

According to an embodiment, a system of an aircraft includes a donor gas turbine engine operable as a compressed air source to cross bleed a regulated pressure and a starting gas turbine engine. The starting gas turbine engine includes an air turbine starter coupled to a gearbox and a starter air valve in fluid communication with the air turbine starter to drive motoring of the starting gas turbine engine responsive to the regulated pressure. A manual override of the starter air valve is adjustable to one or more predefined intermediate positions that partially open the starter air valve to limit a motoring speed of the starting gas turbine engine below a resonance speed of a starting spool of the starting gas turbine engine responsive to the regulated pressure.

In addition to one or more of the features described above, or as an alternative to any of the foregoing embodiments, further embodiments may include a controller that adjusts the at least one valve of the compressed air source in response to at least one parameter of the starting gas turbine engine to maintain the motoring speed of the starting gas turbine engine below the resonance speed.

In addition to one or more of the features described above, or as an alternative to any of the foregoing embodiments, further embodiments may include where the at least one parameter includes one or more of: an engine speed of the starting gas turbine engine, a starter speed of the air turbine starter, and a starter air pressure.

In addition to one or more of the features described above, or as an alternative to any of the foregoing embodiments, further embodiments may include where the controller dynamically adjusts the at least one valve based on one or more of: a pressure change of the compressed air source and a change in a targeted motoring speed of the starting gas turbine engine.

Another embodiment includes a method for gas turbine engine motoring. The method includes opening a flow path from a compressed air source to a starter air valve in fluid communication with an air turbine starter to drive motoring of a gas turbine engine. The compressed air source is controlled to provide a regulated pressure to the starter air valve set to a partially open position based on a manual override that is adjustable to one or more predefined intermediate positions that partially open the starter air valve to limit a motoring speed of the gas turbine engine below a resonance speed of a starting spool of the gas turbine engine responsive to the regulated pressure.

In addition to one or more of the features described above, or as an alternative to any of the foregoing embodiments, further embodiments may include adjusting, by a controller, the at least one valve of the compressed air source in response to at least one parameter of the gas turbine engine to maintain the motoring speed of the gas turbine engine below the resonance speed.

In addition to one or more of the features described above, or as an alternative to any of the foregoing embodiments, further embodiments may include dynamically adjusting, by the controller, the at least one valve based on one or more of:

a pressure change of the compressed air source and a change in a targeted motoring speed of the gas turbine engine.

A technical effect of the apparatus, systems and methods is achieved by using a starter air valve with a manual override for gas turbine engine motoring as described herein.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
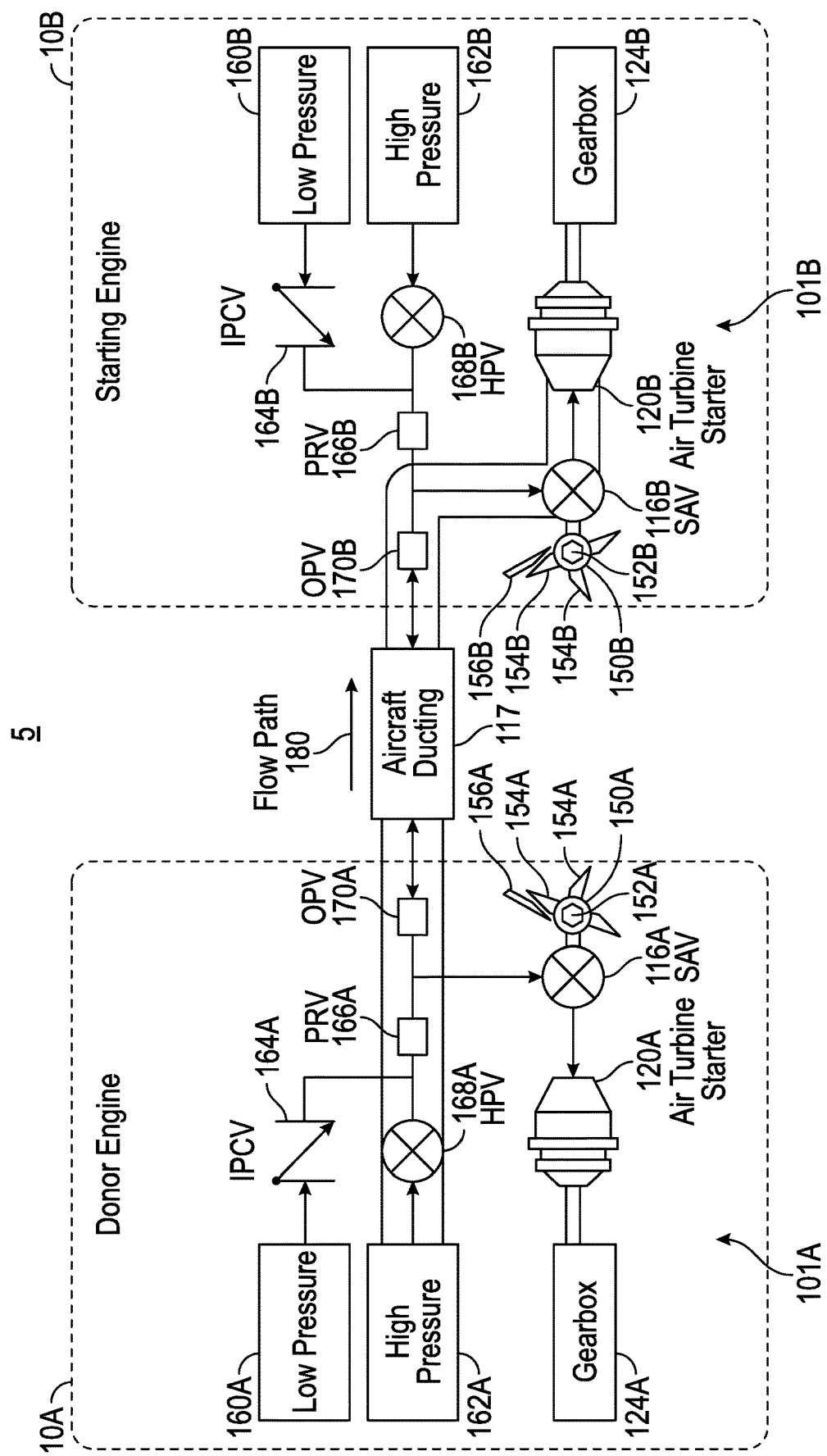
FIG. 1 is a schematic illustration of an aircraft engine starting system in accordance with an embodiment of the disclosure.

Various embodiments of the present disclosure are related to a bowed rotor start mitigation system in a gas turbine engine. Embodiments can include using a starter air valve to control a rotor speed of a starting spool of a gas turbine engine to mitigate a bowed rotor condition using a dry motoring process. Under normal operation during dry motoring, the starter air valve can be actively adjusted to deliver air pressure (i.e., compressed air) from an air supply to an air turbine starter of an engine starting system that controls starting spool rotor speed. Dry motoring may be performed by running an engine starting system at a lower speed with a longer duration than typically used for engine starting while dynamically adjusting the starter air valve to maintain the rotor speed and/or follow a dry motoring profile. The critical rotor speed refers to a major resonance speed where, if the temperatures are unhomogenized, the combination of a bowed rotor and similarly bowed casing and the resonance would lead to high amplitude oscillation in the rotor and high rubbing of blade tips on one side of the rotor, especially in the high pressure compressor if the rotor is straddle-mounted.

A dry motoring profile for dry motoring can be selected based on various parameters, such as a modeled temperature value of the gas turbine engine used to estimate heat stored in the engine core when a start sequence is initiated and identify a risk of a bowed rotor. The modeled temperature value alone or in combination with other values (e.g., measured temperatures) can be used to calculate a bowed rotor risk parameter. For example, the modeled temperature can be adjusted relative to an ambient temperature when calculating the bowed rotor risk parameter. The bowed rotor risk parameter may be used to take a control action to mitigate the risk of starting the gas turbine engine with a bowed rotor. The control action can include dry motoring consistent with the dry motoring profile. In some embodiments, a targeted rotor speed profile of the dry motoring profile can be adjusted as dry motoring is performed.

A full authority digital engine control (FADEC) system or other system may send a message to the cockpit to inform the crew of an extended time start time due to bowed rotor mitigation actions prior to completing an engine start sequence. If the engine is in a ground test or in a test stand, a message can be sent to the test stand or cockpit based on the control-calculated risk of a bowed rotor. A test stand crew can be alerted regarding a requirement to keep the starting spool of the engine to a speed below the resonance speed of the rotor in order to homogenize the temperature of the rotor and the casings about the rotor which also are distorted by temperature non-uniformity. Respective FADECs for each engine of an aircraft can exchange cross engine data including parameters that identify present conditions, commanded actions, scheduled adjustments, and the like which may impact control decisions of each FADEC in performing dry motoring while maintaining the engine speed of the starting spool of the starting engine below a resonance speed.

In embodiments, when a starter air valve fails shut, a manual override is adjusted to a predefined intermediate position that partially opens the starter air valve to limit a motoring speed of the gas turbine engine below a resonance speed of a starting spool of the gas turbine engine responsive to a regulated pressure. In some embodiments, a compressed air source actively adjusts the regulated pressure to achieve dry motoring while the starter air valve is maintained in a partially opened position by the manual override. One or more predefined intermediate positions can be set by one or more detents that limit opening of the starter air valve to specific positions, such as 10% open, 20% open, etc. A pilot and ground crew can coordinate setting of the manual override along with the compressed air source to maintain a starting engine below a resonance speed. In some embodiments, one or more controllers can coordinate adjustments to the regulated pressure based on how close the motoring speed of the starting engine is to a targeted motoring speed while the starter air valve is held at a partially open position by the manual override.

Referring now to FIG. 1, a schematic illustration of an aircraft 5 is depicted with a pair of gas turbine engines 10A, 10B with engine starting systems 101A, 101B respectively. In the example of FIG. 1, each of the engine starting systems 101A, 101B includes a respective air turbine starter 120A, 120B coupled to a gearbox 124A, 124B. Each of the engine starting systems 101A, 101B also includes a starter air valve 116A, 116B in fluid communication with the air turbine starter 120A, 120B to drive motoring of the gas turbine engine 10A, 10B. A controller, such as FADEC 102A, 102B (FIG. 2), typically controls valve operation, for instance, modulation of the starter air valve 116A, 116B to control a motoring speed of the gas turbine engine 10A, 10B during dry motoring. If a starter air valve 116A, 116B fails in a shut position, a corresponding manual override 150A, 150B can be used to manually open the starter air valve 116A, 116B. The manual override 150A, 150B can include a tool interface 152A, 152B to enable a ground crew to open the starter air valve 116A, 116B. To constrain the opening of the starter air valve 116A, 116B, each manual override 150A, 150B can include one or more detents 154A, 154B to set one or more predefined intermediate positions that partially open the starter air valve 116A, 116B to limit a motoring speed of the gas turbine engine 10A, 10B below a resonance speed of a starting spool of the gas turbine engine 10A, 10B responsive to a regulated pressure from a compressed air source. A pawl or catch 156A, 156B may be used to limit movement of the manual override 150A, 150B with respect to detents 154A, 154B, for instance, in a ratcheting mode of operation.

The example of FIG. 1 depicts a cross engine bleed as the compressed air source. In other embodiments, an auxiliary power unit or a ground cart can be a compressed air source for dry motoring. Gas turbine engine 10A is referred to as donor gas turbine engine 10A that is operable as a compressed air source to cross-bleed a regulated pressure to gas turbine engine 10B as a starting gas turbine engine 10B. In such a configuration, when starter air valve 116B fails shut and manual override 150B is used to partially open the starter air valve 116B, the donor gas turbine engine 10A provides a regulated pressure to drive rotation of the air turbine starter 120B for dry motoring of the starting gas turbine engine 10B. The donor gas turbine engine 10A may provide regulated pressure from a low pressure source 160A (e.g., a low compressor bleed) or a high pressure source 162A (e.g., a high compressor bleed). An intermediate pressure valve 164A may limit pressure from the low pressure source 160A to a pressure regulating valve 166A. A high pressure valve 168A may limit pressure from the high pressure source 162A. An overpressure valve 170A can limit pressure between the pressure regulating valve 166A and aircraft ducting 117 that establishes a flow path 180 to the starting gas turbine engine 10B. Depending on the pressure needed for dry motoring, the low pressure source 160A or high pressure source 162A can be selected as a pressure source at the donor gas turbine engine 10A. Similarly, gas turbine engine 10B includes a low pressure source 160B, a high pressure source 162B, an intermediate pressure valve 164B, a pressure regulating valve 166B, a high pressure valve 168B, and an overpressure valve 170B such that the gas turbine engine 10B can act as a donor engine if the starter air valve 116A of gas turbine engine 10A fails. Although FIG. 1 depicts one example configuration, it will be understood that embodiments as described herein can cover a wide range of configurations, such as a four engine system.

Figure 2:
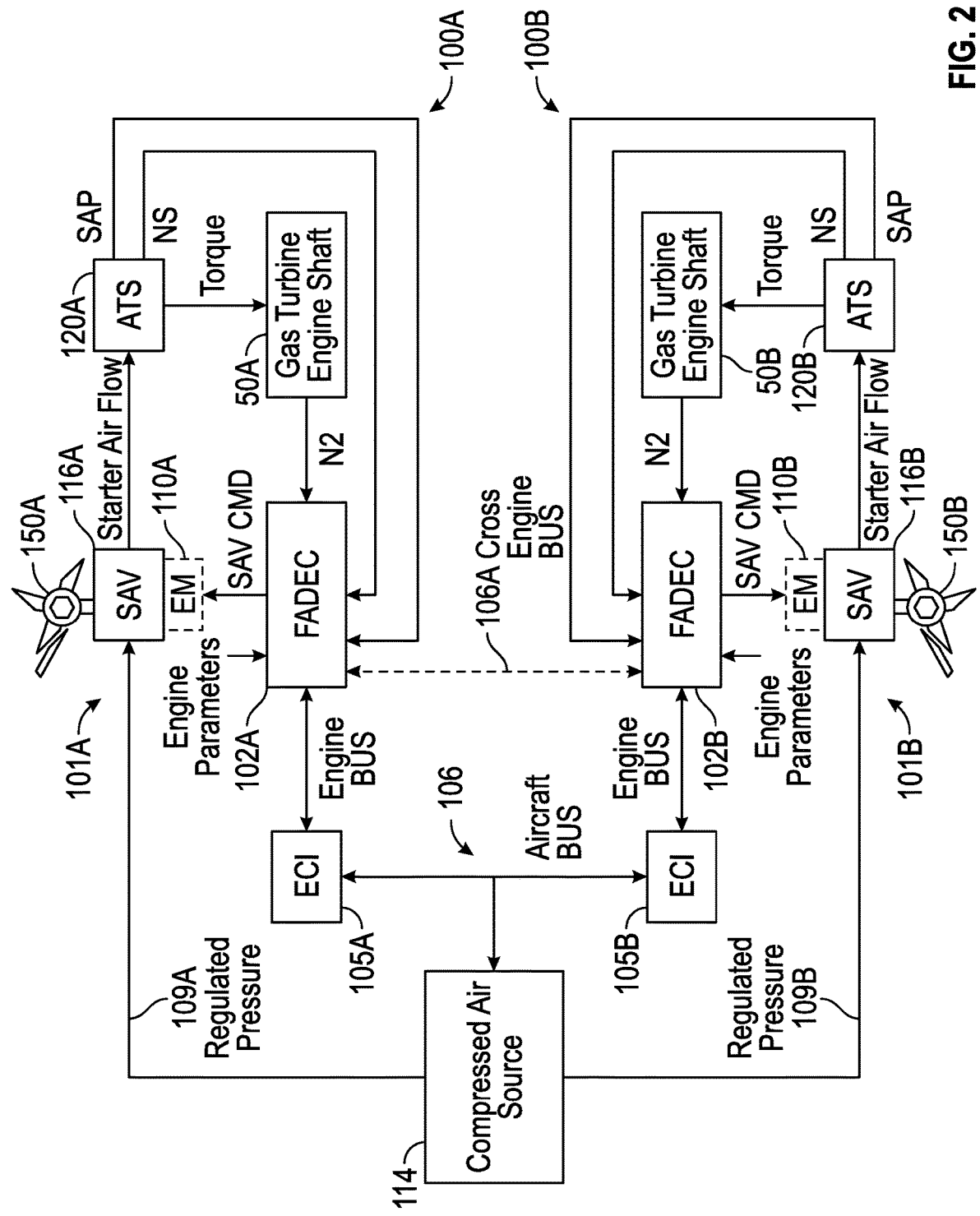
FIG. 2 is another schematic illustration of an aircraft engine starting system in accordance with an embodiment of the disclosure.

Turning now to FIG. 2, a schematic of engine systems 100A, 100B and engine starting systems 101A, 101B for the gas turbine engines 10A, 10B of FIG. 1 are depicted according to an embodiment. Engine systems 100A, 100B can include FADECs 102A, 102B to control gas turbine engines 10A, 10B and starting systems 101A, 101B. FADECs 102A, 102B may generally be referred to as controllers. FADECs 102A, 102B can communicate with respective engine control interfaces 105A, 105B using a digital communication bus 106. The engine control interfaces 105A, 105B can buffer engine system communication from aircraft level communication. Although depicted separately in FIG. 2, in some embodiments the engine control interfaces 105A, 105B are integrated with the FADECs 102A, 102B.

In an embodiment, the FADECs 102A, 102B and engine control interfaces 105A, 105B may each include memory to store instructions that are executed by one or more processors on one or more channels. The executable instructions may be stored or organized in any manner and at any level of abstraction, such as in connection with a controlling and/or monitoring operation of the gas turbine engines 10A, 10B of FIG. 1. The one or more processors can be any type of central processing unit (CPU), including a general purpose processor, a digital signal processor (DSP), a microcontroller, an application specific integrated circuit (ASIC), a field programmable gate array (FPGA), or the like. Also, in embodiments, the memory may include random access memory (RAM), read only memory (ROM), or other electronic, optical, magnetic, or any other computer readable medium onto which is stored data and control algorithms in a non-transitory form.

A compressed air source 114 can provide a regulated pressure 109A, 109B to drive air turbine starters 120A, 120B of engine starting systems 101A, 101B. Compressed air from the compressed air source 114 is routed through ducts 117 (FIG. 1) and air starter valves 116A, 116B to the air turbine starters 120A, 120B. The compressed air source 114 can be an auxiliary power unit, a ground cart, or a cross engine bleed. Various other valves can also be included, such as valves 164A, 164B, 166A, 166B, 168A, 168B, 170A, 170B of FIG. 1, as well as others not depicted, e.g., shutoff valves and the like.

The FADECs 102A, 102B can be configured with control laws to maintain a motoring speed below a threshold level (i.e., the resonance speed) for the engine system 100A, 100B while performing dry motoring based on compressed air source 114. In embodiments, FADECs 102A, 102B can observe various engine parameters and starting system parameters to actively control dry motoring and prevent fault conditions from damaging the gas turbine engines 10A, 10B. For example, FADECs 102A, 102B can observe engine speeds (N2) of gas turbine engines 10A, 10B and may receive starter system parameters such as starter speeds (NS) and/or starter air pressures (SAP). In embodiments, the starter air valves 116A, 116B can be partially opened where the corresponding manual override 150A, 150B is adjusted to one or more predefined intermediate positions.

In the example of FIG. 2, the digital communication bus 106 can include an aircraft, engine, and/or test stand communication bus to interface with FADECs 102A, 102B, engine control interfaces 105A, 105B, aircraft controls, e.g., a cockpit, various onboard computer systems, and/or a test stand (not depicted). In some embodiments, a cross engine bus 106A provides a link between FADECs 102A, 102B as a lower latency communication path between engine systems 100A, 100B, for instance, by avoiding shared communication scheduling conflicts with other aircraft level systems. Under normal operating conditions, either or both channels of FADECs 102A, 102B can alternate on and off commands to respective electromechanical devices 110A, 110B coupled to starter air valves 116A, 116B to achieve a partially open position of the starter air valves 116A, 116B to control a flow of compressed air from compressed air source 114 as a starter air flow to air turbine starters 120A, 120B during dry motoring. The air turbine starters 120A, 120B output torque to drive rotation of respective gas turbine engine shafts 50A, 50B of starting spools of the gas turbine engines 10A, 10B.

The FADECs 102A, 102B can monitor engine speed (N2), starter speed (NS), starter air pressure (SAP), and/or other engine parameters to determine an engine operating state and control the starter air valves 116A, 116B. Thus, the FADECs 102A, 102B can each establish a control loop with respect to a motoring speed (N2 and/or NS) and/or starter air pressure to adjust positioning of the starter air valves 116A, 116B. The FADECs 102A, 102B can also exchange cross engine data on digital communication bus 106 and/or cross engine bus 106A to include present conditions and commands of each engine system 100A, 100B into local control decisions that may impact characteristics of the compressed air available at the starter air valves 116A, 116B.

In some embodiments, the starter air valves 116A, 116B are discrete valves designed as on/off valves that are typically commanded to either fully opened or fully closed.

However, there is a time lag to achieve the fully open position and the fully closed position. By selectively alternating an on-command time with an off-command time through the electromechanical devices 110A, 110B, intermediate positioning states (i.e., partially opened/closed) can be achieved. The FADECs 102A, 102B can modulate the on and off commands (e.g., as a duty cycle using pulse width modulation) to the electromechanical devices 110A, 110B to further open the starter air valves 116A, 116B and increase a rotational speed of the gas turbine engine shafts 50A, 50B. Pneumatic lines or mechanical linkage (not depicted) can be used to drive the starter air valves 116A, 116B between the open position and the closed position. The electromechanical devices 110A, 110B can each be a solenoid that positions the starter air valves 116A, 116B based on intermittently supplied electric power as commanded by the FADECs 102A, 102B. In an alternate embodiment, the electromechanical devices 110A, 110B are electric valves controlling muscle air to adjust the position of the starter air valves 116A, 116B as commanded by the FADECs 102A, 102B.

In an alternate embodiment, rather than using electromechanical devices 110A, 110B to achieve a partially open position of the starter air valves 116A, 116B, the starter air valves 116A, 116B can be variable position valves that are dynamically adjustable to selected valve angles by the FADECs 102A, 102B. When implemented as variable position valves, the starter air valves 116A, 116B can be continuous/infinitely adjustable and hold a commanded valve angle, which may be expressed in terms of a percentage open/closed and/or an angular value (e.g., degrees or radians). Performance parameters of the starter air valves 116A, 116B can be selected to meet dynamic response requirements.

In some embodiments, the FADECs 102A, 102B can each monitor a valve angle of the starter air valves 116A, 116B when valve angle feedback is available. The FADECs 102A, 102B can establish an outer control loop with respect to motoring speed and an inner control loop with respect to the valve angle of the starter air valves 116A, 116B. Valve angle feedback and/or valve commands can be included in the cross engine data exchanged between the FADECs 102A, 102B.

To further enhance control aspects, the FADECs 102A, 102B can exchange cross engine data including parameters that directly or indirectly modify an aspect of the compressed air received at the starter air valves 116A, 116B. Cross engine data can be sent on the digital communication bus 106 or an alternate link (e.g., cross engine bus 106A). Cross engine data may include fault information, such as a detected failure of the starter air valves 116A, 116B and/or the air turbine starters 120A, 120B. Present condition information and/or commands included in the cross engine data can allow the FADECs 102A, 102B to track and/or predict events that will impact available compressed air for dry motoring at each of the engine starting systems 101A, 101B. For example, when starter air valve 116B is partially opened as a result of manual override 150B, FADEC 102A may control donor gas turbine engine 10A as compressed air source 114 and adjust a cross bleed of regulated pressure 109B to limit the motoring speed of the starting gas turbine engine 10B below a resonance speed of a starting spool of the gas turbine engine 10B responsive to the regulated pressure 109B, for instance, by adjusting pressure regulating valve 166A of FIG. 1. Thus, dry motoring feedback for the starting gas turbine engine 10B can be collected by FADEC 102B and sent to FADEC 102A of donor gas turbine engine 10A to increase or decrease the regulated pressure 109B depending on, for instance, how close the starting gas turbine engine 10B is to a targeted speed or pressure for dry motoring of the starting gas turbine engine 10B.

Figure 3:
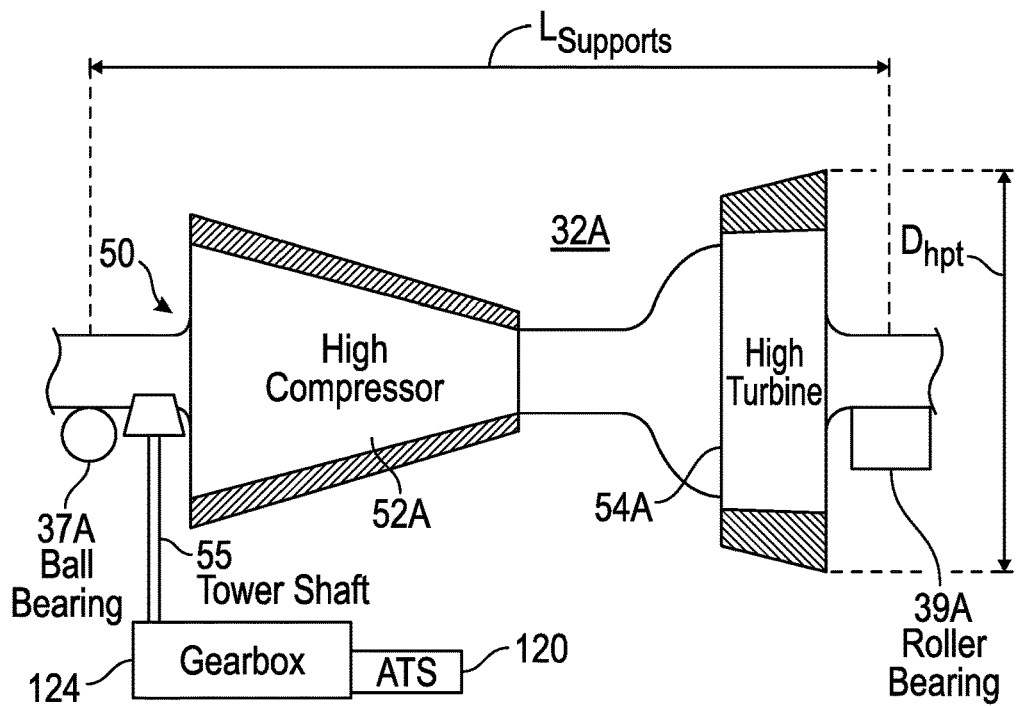
FIG. 3 is a schematic illustration of a high spool gas path with a straddle-mounted spool in accordance with an embodiment of the disclosure.
Figure 4:
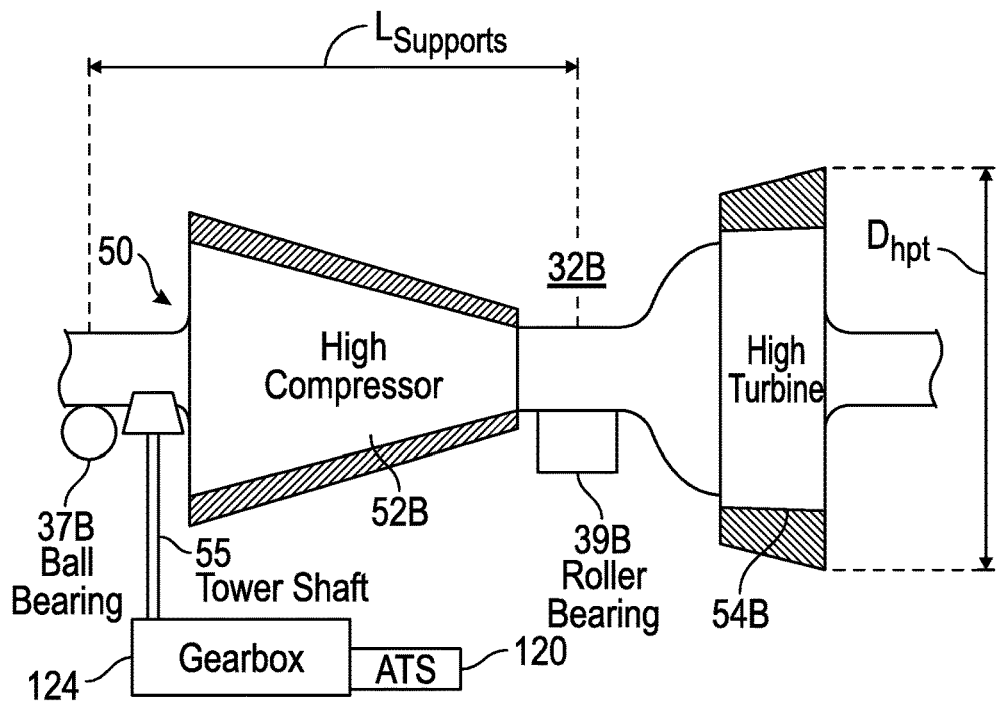
FIG. 4 is a schematic illustration of a high spool gas path with an overhung spool in accordance with an embodiment of the disclosure.

FIGS. 3 and 4 depict two example engine configurations of the gas turbine engines 10A, 10B of FIG. 1. FIG. 3 is an example of a straddle-mounted spool 32A as a starting spool configuration. This configuration places two bearing compartments 37A and 39A (which may include a ball bearing and a roller bearing respectively), outside of the plane of most of the compressor disks of high pressure compressor 52A and at outside at least one of the turbine disks of high pressure turbine 54A. In contrast with a straddle-mounted spool arrangement, other embodiments may be implemented using an over-hung mounted spool 32B as depicted in FIG. 4 as a starting spool configuration. In over-hung mounted spool 32B, a bearing compartment 37B is located forward of the first turbine disk of high pressure turbine 54B such that the high pressure turbine 54B is overhung, and it is physically located aft of its main supporting structure. The use of straddle-mounted spools has advantages and disadvantages in the design of a gas turbine, but one characteristic of the straddle-mounted design is that the span between the bearing compartments 37A and 39A is long, making the amplitude of the high spot of a bowed rotor greater and the resonance speed that cannot be transited prior to temperature homogenization is lower. For any thrust rating, the straddle mounted arrangement, such as straddle-mounted spool 32A, gives Lsupport/Dhpt values that are higher, and the over-hung mounted arrangement, such as overhung spool 32B, can be as much as 60% of the straddle-mounted Lsupport/Dhpt. Lsupport is the distance between bearings (e.g., between bearing compartments 37A and 39A or between bearing compartments 37B and 39B), and Dhpt is the diameter of the last blade of the high pressure turbine (e.g., high pressure turbine 54A or high pressure turbine 54B). As one example, a straddle-mounted engine starting spool, such as straddle-mounted spool 32A, with a roller bearing at bearing compartment 39A located aft of the high pressure turbine 54A may be more vulnerable to bowed rotor problems since the Lsupport/Dhpt ranges from 1.9 to 5.6.

FIGS. 3 and 4 also illustrate an air turbine starter 120 (e.g., air turbine starter 120A or 120B of FIGS. 1 and 2) interfacing through gearbox 124 via a tower shaft 55 with the straddle-mounted spool 32A proximate high compressor 52A and interfacing via tower shaft 55 with the overhung mounted spool 32B proximate high compressor 52B as part of a starting system. The straddle-mounted spool 32A and the over-hung mounted spool 32B are both examples of a starter spool having a gas turbine engine shaft 50 driven by the air turbine starter 120, such as gas turbine engine shafts 50A, 50B driven by air turbine starters 120A, 120B of FIG. 2.

Figure 5:
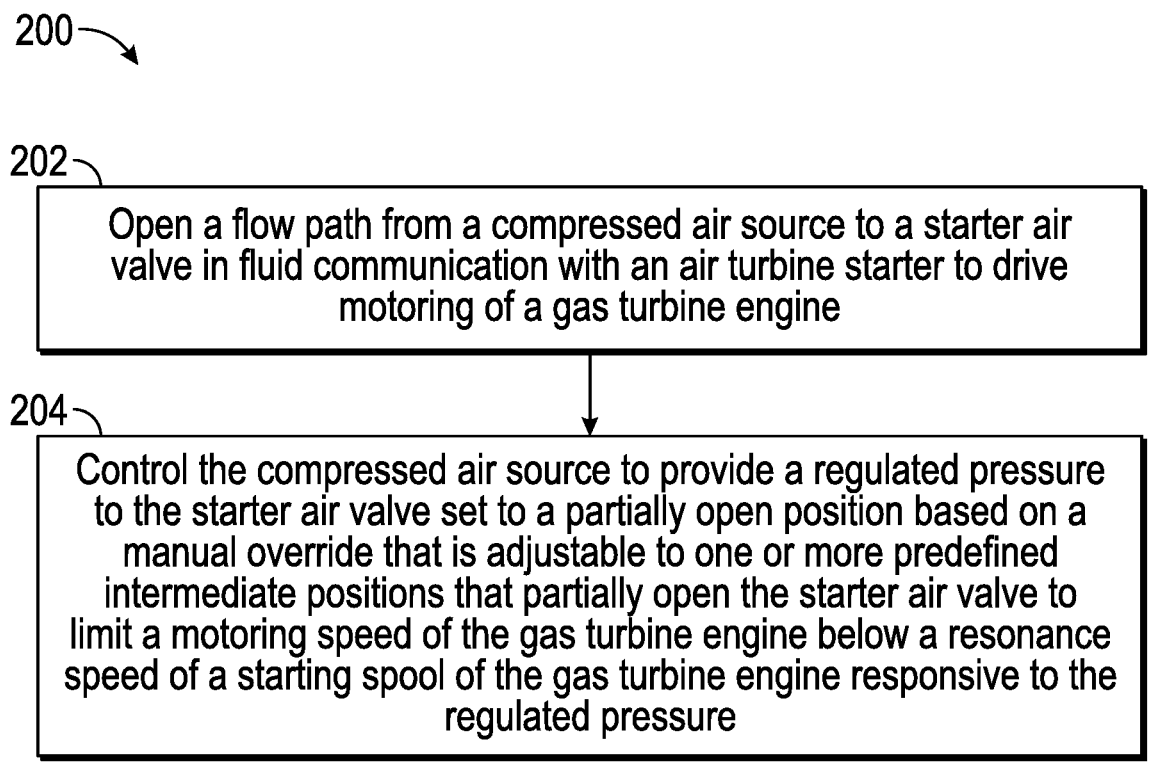
FIG. 5 is a flow chart illustrating a method in accordance with an embodiment of the disclosure.

FIG. 5 is a flow chart illustrating a method 200 for gas turbine engine motoring in accordance with an embodiment. The method 200 of FIG. 5 is described in reference to FIGS. 1-4 and may be performed with an alternate order and include additional steps. Before initiating bowed rotor start mitigation, a bowed rotor determination step can be performed to estimate a need for bowed rotor start mitigation. Examples include the use of models and/or stored/observed engine/aircraft state data of the gas turbine engines 10A, 10B. If there is no need for bowed rotor start mitigation, a non-responsive starter air valve 116A, 116B can be fully opened using the manual override 150A, 150B. However, if it is known or uncertain as to whether bowed rotor mitigation is needed, the method 200 can be performed.

At block 202, a flow path 180 is opened from a compressed air source 114 to a starter air valve 116A, 116B in fluid communication with an air turbine starter 120A, 120B to drive motoring of a gas turbine engine 10A, 10B. Opening of the flow path 180 can include adjusting one or more valves and powering the compressed air source 114 to provide a regulated pressure 109A, 109B. In embodiments where multiple compressed air sources are available, the compressed air source 114 having a reliable ability to set and regulate pressure may be selected, e.g., cross bleed may be preferred to a ground cart or auxiliary power unit due to more precise pressure control characteristics in some embodiments.

At block 204, the compressed air source 114 is controlled to provide a regulated pressure 109A, 109B to the starter air valve 116A, 116B set to a partially open position based on a manual override 150A, 150B that is adjustable to one or more predefined intermediate positions that partially open the starter air valve 116A, 116B to limit a motoring speed of the gas turbine engine 10A, 10B below a resonance speed of a starting spool (e.g., straddle-mounted spool 32A or overhung mounted spool 32B) of the gas turbine engine 10A, 10B responsive to the regulated pressure 109A, 109B. The one or more predefined intermediate positions can be set by one or more detents 154A, 154B. The regulated pressure 109A, 109B can be set by at least one valve of the compressed air source 114, such as pressure regulating valve 166A, 166B. A controller, such as FADEC 102A, 102B, can adjust the at least one valve of the compressed air source 114 in response to at least one parameter of the gas turbine engine 10A, 10B to maintain the motoring speed of the gas turbine engine 10A, 10B below the resonance speed. The at least one parameter can be one or more of: an engine speed of the gas turbine engine 10A, 10B, a starter speed of the air turbine starter 120A, 120B, and a starter air pressure. The controller can dynamically adjust the at least one valve based on one or more of: a pressure change of the compressed air source 114 and a change in a targeted motoring speed of the gas turbine engine 10A, 10B. The targeted motoring speed can be a fixed value below the resonance speed or may vary according to a dry motoring profile or other control source.

Accordingly and as mentioned above, it is desirable to detect, prevent and/or clear a "bowed rotor" condition in a gas turbine engine that may occur after the engine has been shut down. As described herein and in one non-limiting embodiment, the FADECs 102A, 102B (e.g., controller 102) may be programmed to automatically take the necessary measures in order to provide for a modified start sequence without pilot intervention other than the initial start request. In an exemplary embodiment, the FADECs 102A, 102B, and/or engine control interfaces 105A, 105B comprises a microprocessor, microcontroller or other equivalent processing device capable of executing commands of computer readable data or program for executing a control algorithm and/or algorithms that control the start sequence of the gas turbine engine. In order to perform the prescribed functions and desired processing, as well as the computations therefore (e.g., the execution of Fourier analysis algorithm(s), the control processes prescribed herein, and the like), the FADECs 102A, 102B, and/or engine control interfaces 105A, 105B may include, but not be limited to, a processor(s), computer(s), memory, storage, register(s), timing, interrupt(s), communication interfaces, and input/output signal interfaces, as well as combinations comprising at least one of the foregoing. For example, the FADECs 102A, 102B, and/or engine control interfaces 105A, 105B may include input signal filtering to enable accurate sampling and conversion or acquisitions of such signals from communications interfaces. As described above, exemplary embodiments of the disclosure can be implemented through computer-implemented processes and apparatuses for practicing those processes.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A system for gas turbine engine motoring, the system comprising:
   an air turbine starter coupled to a gearbox of a gas turbine engine;
   a starter air valve in fluid communication with the air turbine starter to drive motoring of the gas turbine engine responsive to a regulated pressure from a compressed air source; and
   a manual override of the starter air valve, the manual override adjustable to one or more predefined intermediate positions that partially open the starter air valve between a fully opened position and a fully closed position to limit a motoring speed of the gas turbine engine below a resonance speed of a starting spool of the gas turbine engine responsive to the regulated pressure, wherein the one or more predefined intermediate positions are set by one or more detents that limit an opening position of the starter air valve to a specific position per detent.

2. The system as in claim 1, wherein the compressed air source is an auxiliary power unit, a ground cart, or a cross engine bleed.

3. The system as in claim 1, wherein at least one valve of the compressed air source sets the regulated pressure.

4. The system as in claim 3, further comprising a controller that adjusts the at least one valve of the compressed air source in response to at least one parameter of the gas turbine engine to maintain the motoring speed of the gas turbine engine below the resonance speed.

5. The system as in claim 4, wherein the at least one parameter comprises one or more of: an engine speed of the gas turbine engine, a starter speed of the air turbine starter, and a starter air pressure.

6. The system as in claim 4, wherein the controller dynamically adjusts the at least one valve based on one or more of: a pressure change of the compressed air source and a change in a targeted motoring speed of the gas turbine engine.

7. A system of an aircraft, the system comprising:
   a donor gas turbine engine operable as a compressed air source to cross bleed a regulated pressure; and a starting gas turbine engine comprising:
- an air turbine starter coupled to a gearbox;
- a starter air valve in fluid communication with the air turbine starter to drive motoring of the starting gas turbine engine responsive to the regulated pressure; and
- a manual override of the starter air valve, the manual override adjustable to one or more predefined intermediate positions that partially open the starter air valve between a fully opened position and a fully closed position to limit a motoring speed of the starting gas turbine engine below a resonance speed of a starting spool of the starting gas turbine engine responsive to the regulated pressure, wherein the one or more predefined intermediate positions are set by one or more detents that limit an opening position of the starter air valve to a specific position per detent.

8. The system of claim 7, wherein at least one valve of the compressed air source sets the regulated pressure.

9. The system of claim 8, further comprising a controller that adjusts the at least one valve of the compressed air source in response to at least one parameter of the starting gas turbine engine to maintain the motoring speed of the starting gas turbine engine below the resonance speed.

10. The system of claim 9, the at least one parameter comprises one or more of: an engine speed of the starting gas turbine engine, a starter speed of the air turbine starter, and a starter air pressure.

11. The system of claim 9, wherein the controller dynamically adjusts the at least one valve based on one or more of: a pressure change of the compressed air source and a change in a targeted motoring speed of the starting gas turbine engine.

12. A method for gas turbine engine motoring, the method comprising:
- opening a flow path from a compressed air source to a starter air valve in fluid communication with an air turbine starter to drive motoring of a gas turbine engine; and
- controlling the compressed air source to provide a regulated pressure to the starter air valve set to a partially open position based on a manual override that is adjustable to one or more predefined intermediate positions that partially open the starter air valve between a fully opened position and a fully closed position to limit a motoring speed of the gas turbine engine below a resonance speed of a starting spool of the gas turbine engine responsive to the regulated pressure, wherein the one or more predefined intermediate positions are set by one or more detents that limit an opening position of the starter air valve to a specific position per detent.

13. The method as in claim 12, wherein the compressed air source is an auxiliary power unit, a ground cart, or a cross engine bleed.

14. The method as in claim 12, further comprising setting the regulated pressure by at least one valve of the compressed air source.

15. The method as in claim 14, further comprising adjusting, by a controller, the at least one valve of the compressed air source in response to at least one parameter of the gas turbine engine to maintain the motoring speed of the gas turbine engine below the resonance speed.

16. The method as in claim 15, wherein the at least one parameter comprises one or more of: an engine speed of the gas turbine engine, a starter speed of the air turbine starter, and a starter air pressure.

17. The method as in claim 15, further comprising dynamically adjusting, by the controller, the at least one valve based on one or more of: a pressure change of the compressed air source and a change in a targeted motoring speed of the gas turbine engine.

\* \* \* \* \*